United States Patent
Langbein et al.

(10) Patent No.: US 8,833,071 B2
(45) Date of Patent: Sep. 16, 2014

(54) ADAPTIVE SPRING, DAMPING OR HINGE SYSTEM

(75) Inventors: Sven Langbein, Menden (DE); Alexander Czechowicz, Bochum (DE)

(73) Assignee: FG-Innovation GmbH, Bochum (DE)

( * ) Notice: Subject to any disclaimer, the term of this patent is extended or adjusted under 35 U.S.C. 154(b) by 247 days.

(21) Appl. No.: 13/200,702

(22) Filed: Sep. 28, 2011

(65) Prior Publication Data
US 2013/0075210 A1  Mar. 28, 2013

(51) Int. Cl.
*F01B 29/10* (2006.01)
*F16F 1/00* (2006.01)

(52) U.S. Cl.
CPC .................................... *F16F 1/00* (2013.01)
USPC ............. 60/528; 267/166; 310/307; 337/140; 337/385; 337/395

(58) Field of Classification Search
USPC .......... 188/382, 276, 379, 380; 267/182, 136, 267/166; 296/180.1–180.5; 60/527, 528, 60/529; 310/307; 318/117; 337/140, 393, 337/395; 361/211
See application file for complete search history.

(56) References Cited

U.S. PATENT DOCUMENTS

| | | | |
|---|---|---|---|
| 4,761,955 A | 8/1988 | Bloch | |
| 4,806,815 A * | 2/1989 | Honma | 310/307 |
| 5,211,371 A * | 5/1993 | Coffee | 251/11 |
| 5,400,961 A | 3/1995 | Tsutsui et al. | |
| 5,977,858 A * | 11/1999 | Morgen et al. | 337/140 |
| 6,039,030 A | 3/2000 | Robinson et al. | |
| 6,374,608 B1 * | 4/2002 | Corris et al. | 60/528 |
| 7,500,704 B2 * | 3/2009 | Herrera et al. | 296/37.12 |
| 7,688,533 B2 * | 3/2010 | Wada et al. | 359/823 |
| 7,845,709 B2 * | 12/2010 | Browne et al. | 296/180.5 |
| 8,056,335 B1 * | 11/2011 | Brown | 60/528 |
| 8,348,201 B2 * | 1/2013 | Pecora et al. | 244/213 |
| 2007/0216194 A1 * | 9/2007 | Rober et al. | 296/180.1 |
| 2009/0301077 A1 * | 12/2009 | Takahashi | 60/528 |
| 2010/0045214 A1 * | 2/2010 | Matsuki | 318/117 |
| 2013/0042927 A1 * | 2/2013 | Neelakantan et al. | 137/334 |

FOREIGN PATENT DOCUMENTS

| | | |
|---|---|---|
| DE | 198 02 639 A1 | 7/1999 |
| DE | 10 2007 010 693 A1 | 9/2008 |
| DE | 60 2005 004 919 T2 | 2/2009 |

* cited by examiner

*Primary Examiner* — Thomas J Williams
*Assistant Examiner* — Mariano Sy
(74) *Attorney, Agent, or Firm* — Kriegsman & Kriegsman

(57) ABSTRACT

The invention relates to an adaptive spring, damping or hinge system having functional characteristics that are adaptable to various operating conditions, with provision being made for at least one adaptive spring system or a damping or hinge system formed of shape memory material to be activatable in such a manner that by subjecting it to heating or to an annealing treatment, the spring, damping or hinge characteristics may be modified in operation condition, and/or that at least one variable actuator element formed of a shape memory material is provided and is capable of changing the spring, damping or hinge characteristics of the adaptive system.

10 Claims, 1 Drawing Sheet

ADAPTIVE SPRING, DAMPING OR HINGE SYSTEM

The invention relates to an adaptive spring, damping or hinge system having functional characteristics which may be adapted to different operating conditions.

It is known in the art that shape memory elements may be used for creating actuation movements in that a heat-induced deformation associated with a crystalline transformation is followed by a restoration of their respective initial shapes. In addition, shape memory elements are used as spring or damping elements and as solid state hinges. In this case, crystalline transformation is tension-induced. In both fields of application, the shape memory elements are capable of recovering a given shape which has previously been memorised in the course of a annealing treatment. It is further known in the art that a contraction or extension of the shape memory element due to a change in temperature will cause an actuating movement of the actuating element. During the cooling process, the initial condition is restored with the aid of a steel spring, as the re-transformation process starts. However, actuators of this type, such as the ones described in DE 198 02 639 A1, a movement device with shape memory actuator, or in U.S. Pat. No. 4,761,955, a rotational actuator, as well as a valve actuator for an electromechanically actuated thermostatic valve, as in U.S. Pat. No. 5,400,961, or a valve actuator for a fuel supply system, as in U.S. Pat. No. 6,039,030, and other actuators share the disadvantage that the shape memory effect, and thus the effective distance of travel, will not remain constant but, over time, tends to diminish, which has a negative influence on the actuator's service life. The higher the load to which the actuator is subjected in terms of actuating force and distance of travel, the more rapid the shape memory effect will diminish. This is referred to among specialists as functional fatigue. It is, therefore, highly interesting to create adaptive spring systems that are capable of adapting the restoring force to the actual requirements of a given operating situation. It is further known in the art that any modification in the pre-loading of an actuator element made of shape memory material will lead to a change in its transformation temperatures. By providing an adaptive restoring and/or pre-loading system it is therefore possible to change or adjust the transformation temperature of shape memory actuator elements during operation. The utilisation of a shape memory element as an adaptive spring element is not limited, however, to its use in shape memory actuators but may also be envisaged in other actuator systems based, for example, on electromagnets, or, more generally speaking, in technical systems of any type in which spring elements are employed. In a way equivalent to that of spring elements, solid state hinges made of shape memory material equally offer the possibility to adjust hinge characteristics such as stiffness in accordance with the operating situation, i.e., in an adaptive manner.

Another characteristic of shape memory materials is their highly effective damping capacity. Consequently, shape memory materials are apt for being employed as adaptive damping elements. The utilisation of SMA-based, non-adaptive damping elements is known from DE 10 2007 010 693 A1 for a bearing assembly designed for the damping of shocks and for the compensation of angular errors, and from DE 60 2005 004 919 T2 for a disc brake having shape memory damping means. With these publications in mind, which are to be considered as the state of the art, the invention is based on the object of providing an adaptive system which may be utilised, depending to its function, as a spring, damping or hinge system, and the functional characteristics, i.e. the spring and damping characteristics or the stiffness, of which may be modified, such that it is possible to create, in a technically simple manner, an adaptive spring, damping or hinge performance which may be adapted to, and used in, a variety of different operating conditions.

This object is achieved, according to the invention, by proposing to provide at least one adaptive spring system or a damping or hinge system formed of shape memory material which may be activated in such a manner that by subjecting it to heating or to an annealing treatment, the spring, damping or hinge characteristics may be modified in a operation condition, and/or that at least one variable actuator element formed of a shape memory material is provided which modifies the spring, damping or hinge characteristics of the adaptive system.

Preferably, provision is made for the adaptive spring, damping or hinge system to be formed of a shape memory element having a pseudo-elastic shape memory effect, with provision being made for the spring and damping characteristics or the stiffness to be modifiable either temporarily in an operation condition through heating or permanently through an annealing treatment, such that in doing so the material characteristics such as, for example, the plateau tension and, consequently, the spring and damping characteristics, are either modified temporarily, and the heating process taking place for example through a supply of electric current, comparable to electric activation, or that, in an operation condition, the characteristics of the shape memory element are modified permanently through subjecting the shape memory element to a short time annealing process by which the material characteristics such as the plateau tension, and, consequently, the spring and damping characteristics will be modified. The annealing process may also be performed by supplying higher amounts of electric current. In addition, for the purpose of creating multiple changes, the annealing process may be performed several times.

Preferably, provision is made for the adaptive spring, damping or hinge system formed of a shape memory element having a thermal shape memory effect, with provision being made its mechanical characteristics being changed temporarily, through heating and the crystalline transformation associated therewith, or permanently by means of an annealing treatment.

One preferred embodiment envisages an adaptive spring element formed of shape memory material to be provided separately or envisages an adaptive spring element formed of shape memory material to be provided in operative engagement with a conventional spring element.

Another preferred embodiment envisages an adaptive shape memory element having a thermal shape memory effect in operative engagement with a conventional spring or damping element to perform an actuating movement when heated, with the conventional spring or damping element being pre-loaded or limited in its motion in such a manner that its spring characteristic curve and its spring properties may be modified.

This makes it possible for the shape memory actuator element to be used to tension a conventional spring, e.g. a steel spring, or to relax its tension, thus increasing or reducing the spring force thereof. This process of tensioning or relaxation may, on the one hand, be performed temporarily by heat input to a shape memory actuator element, the martensite plateau force of which is below the spring force. On the other hand, it is possible to use an actuator element made of a shape memory material having a plateau force superior to the spring force in order to provoke a permanent modification of the spring characteristics. Due to a phase change of the shape memory element, which passes from martensite to austenite, a change in its spring and damping characteristics is generated. This implies that in operation condition a resistance heating equipment must be used to heat the shape memory element to a temperature beyond the transformation point. The heating may be performed, for example, by applying an electric current, via the inherent resistance of the shape memory element, or may be caused by the ambient heat.

Owing to the fact that the shape memory element may be employed for setting amounts of pre-loading of a conventional return spring or may itself be used as a return spring, for example of a shape memory actuator, it is possible to achieve an optimisation of its performance and its fatigue characteristics or an increase in the transformation temperatures corresponding to specific requirements.

An advantageous further development consists in the fact that the adaptive spring, damping, hinge, and actuator elements based on shape memory alloys may have different designs and may perform different types of movement, and in the fact that a plurality of adaptive spring, damping, hinge, and actuator elements are connected in parallel or in series.

A particularly advantageous development envisages the heat or the annealing treatment for the shape memory elements to be preferably provided via the electric current and the inherent resistance of the shape memory element as well as via an ambient heat.

In the following, the invention will be illustrated in greater detail with reference being made to example embodiments represented in drawings.

Figure 1:
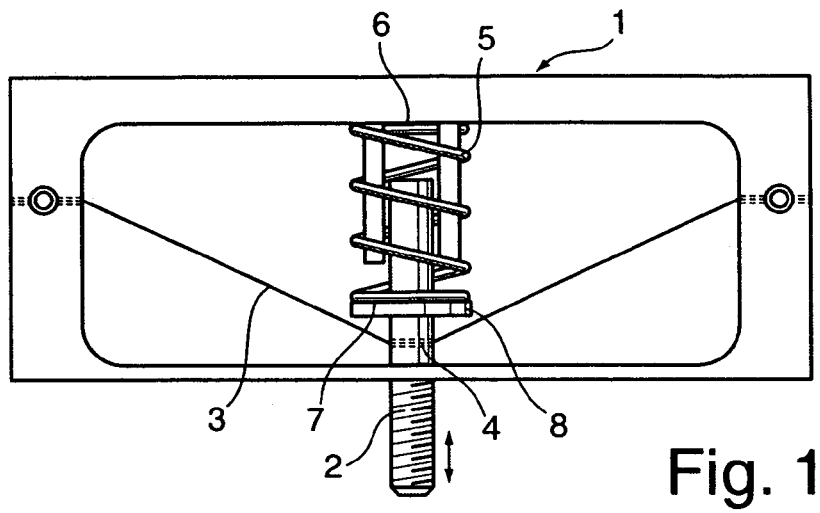
FIG. 1 is a first example embodiment of an adaptive system having a modifiable return spring made of a shape memory material.
Figure 2:
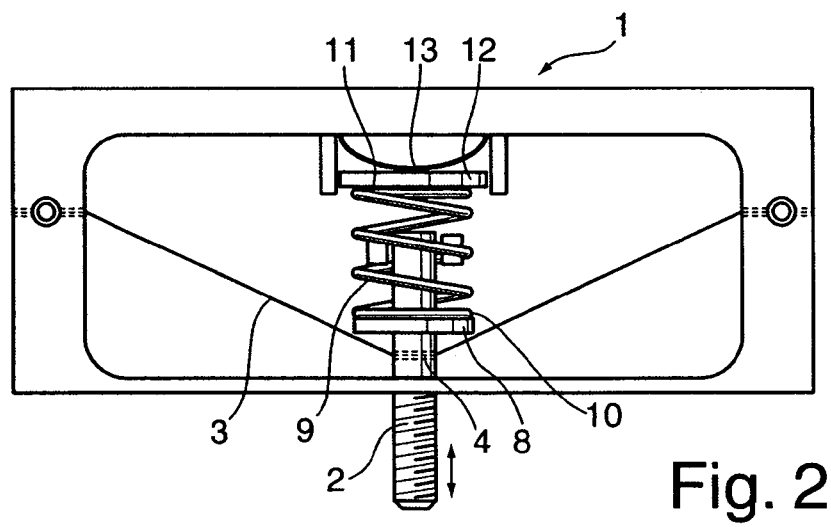
FIG. 2 is another example embodiment of an adaptive system having a conventional return spring made of steel and displaying a characteristic curve which may be modified by means of an actuator element made of a shape memory material.

FIG. 1 shows an example embodiment of a shape memory actuator 1 having an adaptive spring system according to the invention in an operating condition. Within a housing of the shape memory actuator 1 an actuating element 2 is accommodated and longitudinally guided in such a manner that the actuating element 2 performs a translational up and down movement. At a coupling point 4, the actuating element 2 is coupled with a shape memory element 3 in such a way that heating of the shape memory element 3 will cause the actuating element 2 to move upwards. A return spring 5 is arranged for restoring the actuating element 2 which is made of a shape memory material to its initial position. To this effect, the one end 6 of the return spring 5 made of shape memory material abuts against the housing of the shape memory actuator 1 and another end 7 of the return spring 5 made of shape memory material abuts on a shoulder 8 of the actuating element 2. Formed from a shape memory material having a thermal shape memory effect, the return spring 5 will change its mechanical characteristics either temporarily through heating and the crystalline transformation associated therewith, or permanently by means of an annealing treatment, thus assuming the function of an adaptive spring system. Alternatively, a return spring 5 formed of shape memory material having a pseudo-elastic shape memory effect that changes its mechanical characteristics either temporarily through heating or permanently through an annealing treatment may be employed. In a second example embodiment, shown in FIG. 2, a conventional, cylindrical coils spring 9 made of steel is used as a return spring. The return spring 9 made of steel abuts with one end 10 against the shoulder 8 of the actuating element 2 and with its other end 11 against a support plate 12 that is accommodated and guided within the housing of the shape memory actuator 1 in such a manner that the support plate 12 may perform a translational up and down movement. By means of an actuator element 13, realised as a spring subjected to bending, the return spring 9 made of steel is pressed downwards. The shape memory element 3 will change its mechanical characteristics either temporarily through heating and the crystalline transformation associated therewith, or permanently by means of an annealing treatment, and this will result in a modification of the pre-loading of the return spring 9 made of steel.

Figure 3:
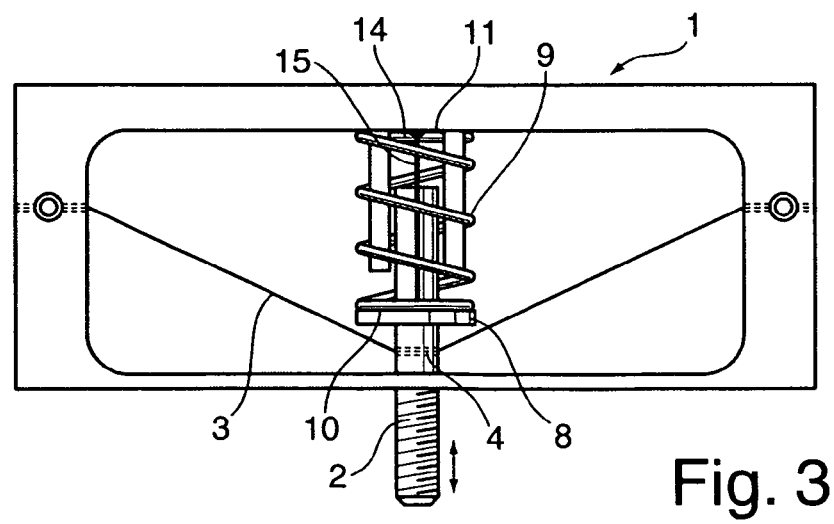
FIG. 3 is a further example embodiment of an adaptive system having a conventional return spring made of steel and displaying a characteristic curve which may be modified by means of a wire-like shape memory element.

In a third example embodiment, shown in FIG. 3, a cylindrical coil spring 9 made of steel is arranged and is equally used as a return spring. The return spring 9 made of steel abuts with the one end 10 against the shoulder 8 of the actuating element 2 and with its other end 11 against the housing of the shape memory actuator 1. Extending in parallel with the return spring 9 made of steel, a wire-like shape memory element 15 is disposed in a centre 14 of the return spring 9 which will change its mechanical characteristics either temporarily through heating and the crystalline transformation associated therewith, or permanently by means of an annealing treatment, thus modifying the characteristic curve and/or the forces of the spring system.

Generally speaking, it is possible for a plurality of return springs made of shape memory material to be arranged in parallel with respect to each other.

The invention is not limited to the example embodiment shown but may be varied as far as the methods employed are concerned. It also comprises in particular variants that may be constructed by combining individual characteristics and/or elements described here in conjunction with the present invention. Any of the characteristics mentioned in the preceding description and shown in the drawings shall be deemed to be part of the invention, even though they may not be particularly emphasised or mentioned in the claims.

The invention claimed is:

1. A shaped memory actuator having functional characteristics that are adaptable to various operation conditions, comprising:
    a housing,
    an actuating element which is accommodated in the housing and is guided in the housing to perform a translational up and down movement,
    at least one variable actuator element formed of shaped memory material which is coupled with the actuating element and the housing, and
    at least one adaptive spring system or adaptive damping system having an adaptive spring element or adaptive damping element formed of shaped memory material and has a restoring element acting against the adaptive spring element or adaptive damping element for modifying mechanical characteristic in operation of the adaptive spring system or adaptive damping system by heating, which results in a modification of a preloading of the restoring element.

2. The shaped memory actuator as claimed in claim 1, characterised in that
    the adaptive spring element or the adaptive damping element is formed of the shaped memory material having a pseudo-elastic shape memory effect, with provision being made for spring and damping characteristics of the shaped memory material or stiffness of the shaped memory material to be modifiable either temporarily, in operation condition, through heating or permanently through an annealing treatment.

3. The shaped memory actuator as claimed in claim 1, characterised in that
the adaptive spring element or adaptive damping element has a thermal shape memory effect, the mechanical characteristic of the adaptive spring element or adaptive damping element changed either temporarily, through heating and crystalline transformation associated therewith, or permanently through an annealing treatment.

4. The shaped memory actuator as claimed in claim 1, characterised in that
the adaptive spring element or adaptive damping element formed of the shaped memory material is provided as a separate part.

5. The shaped memory actuator as claimed in claim 1, characterised in that
the adaptive spring element is formed of shaped memory material and is provided in operative engagement with the restoring element.

6. The shaped memory actuator as claimed in claim 1, characterised in that
the adaptive spring element or adaptive damping element having a thermal shaped memory effect, is in operative engagement with the restoring element, performs an actuating movement when heated, with the restoring element being pre-loaded or limited in the motion in such a manner that a spring characteristic curve and spring properties of the adaptive spring element or adaptive damping element are modified.

7. The shaped memory actuator as claimed in claim 1, characterised in that
the at least one adaptive spring system or adaptive damping system having an adaptive spring element or adaptive damping element formed of the shaped memory material comprises a plurality of the adaptive spring systems or the adaptive damping systems having an adaptive spring element or adaptive damping element that have different designs and types of movement.

8. The shaped memory actuator as claimed in claim 1, characterised in that
the at least one adaptive spring system or adaptive damping system comprising a plurality of the adaptive spring systems or the adaptive damping systems wherein the plurality of the adaptive spring systems or the adaptive damping systems are connected in parallel or in series.

9. The shaped memory actuator as claimed in claim 1, characterised in that
a heating or an annealing treatment for the adaptive spring element or adaptive damping element is provided via an electric current or an inherent resistance of the shaped memory material or via an ambient heat.

10. The shaped memory actuator as claimed in claim 1, characterised in that
the adaptive spring element or adaptive damping element designed for changing amounts of pre-loading of the restoring element of the adaptive spring element or adaptive damping element is employed for optimising a performance and fatigue characteristics or for increasing transformation temperatures corresponding to specific requirements of the adaptive spring element or adaptive damping element.

* * * * *